(12) United States Patent
Ramaswamy et al.

(10) Patent No.: US 8,412,645 B2
(45) Date of Patent: Apr. 2, 2013

(54) AUTOMATIC DETECTION OF UNDESIRABLE USERS OF AN ONLINE COMMUNICATION RESOURCE BASED ON CONTENT ANALYTICS

(75) Inventors: Ganesh N. Ramaswamy, Mohegan Lake, NY (US); Imed Zitouni, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 12/129,803

(22) Filed: May 30, 2008

(65) Prior Publication Data
US 2009/0299925 A1 Dec. 3, 2009

(51) Int. Cl.
*G06N 5/00* (2006.01)
(52) U.S. Cl. ............... 706/12; 706/45
(58) Field of Classification Search ............ 706/12, 706/45
See application file for complete search history.

(56) References Cited

U.S. PATENT DOCUMENTS

| | | | | |
|---|---|---|---|---|
| 5,897,616 | A * | 4/1999 | Kanevsky et al. | 704/246 |
| 2006/0130070 | A1 * | 6/2006 | Graf | 719/318 |
| 2007/0136475 | A1 | 6/2007 | Leppisaari et al. | |
| 2007/0261109 | A1 | 11/2007 | Renaud et al. | |
| 2007/0282623 | A1 | 12/2007 | Dattorro | |
| 2008/0033941 | A1 | 2/2008 | Parrish | |

OTHER PUBLICATIONS

Hennebert, Hidden Markov Models and Artificial Neural Networks for Speech and Speaker Recognition, Doctoral Thesis, Ecole Polytechnique Federale De Lausanne, Oct. 16, 1998, pp. 1-143.*
A.L. Berger et al., "A Maximum Entropy Approach to Natural Language Processing," Association for Computational Linguistics, Mar. 1996, pp. 39-71, vol. 22, No. 1.
B. Bigi et al., "A Comparative Study of Topic Identification on Newspaper and E-mail," Proceedings of the Eighth International Symposium on String Processing and Information Retrieval, Nov. 2001, pp. 238-241.
Christopher J.C. Burges, "A Tutorial on Support Vector Machines for Pattern Recognition," Data Mining and Knowledge Discovery, Jun. 1998, pp. 121-167, vol. 2, No. 2.

(Continued)

*Primary Examiner* — Wilbert L Starks
(74) *Attorney, Agent, or Firm* — Anne V. Dougherty; Ryan, Mason & Lewis, LLP

(57) ABSTRACT

An exemplary processor-implemented method of determining whether a user of an online communication resource is an undesirable user includes the steps of building at least one model based on at least one feature of a feature set using at least one machine learning technique; and classifying the user by comparing at least one feature of the feature set that is associated with the user to the at least one model, a determination as to whether the user is an undesirable user being based at least in part on the classification of the user.

24 Claims, 4 Drawing Sheets

OTHER PUBLICATIONS

Joshua Goodman, "Exponential Priors for Maximum Entropy Models," HLT-NAACL 2004, Main Proceedings, Association for Computational Linguistics, May 2004, pp. 305-312.

J.D. Lafferty et al., "Conditional Random Fields: Probabilistic Models for Segmenting and Labeling Sequence Data," Proceedings of the Eighteenth International Conference on Machine Learning, Jun. 2001, pp. 282-289.

P. Langley et al., "An Analysis of Bayesian Classifiers," Proceedings of the Tenth National Conference on Artificial Intelligence, Jul. 1992, pp. 223-228.

C. Saunders et al., "Support Vector Machine Reference Manual," Technical Report: Department of Computer Science, Royal Holloway, University of London, Jul. 1998, pp. 1-26.

I. Zitouni et al., "Constrained Minimization Technique for Topic Identification Using Discriminative Training and Support Vector Machines," Proceedings of the Eighth International Conference on Spoken Language Processing, Oct. 2004, pp. 181-184.

Y. Fruend et al., "Large Margin Classification Using the Perceptron Algorithm," Machine Learning, Dec. 1999, pp. 277-296, vol. 37, No. 3.

* cited by examiner

400

500

AUTOMATIC DETECTION OF UNDESIRABLE USERS OF AN ONLINE COMMUNICATION RESOURCE BASED ON CONTENT ANALYTICS

FIELD OF THE INVENTION

The present invention relates generally to online communication resources, and more particularly relates to techniques for automatically detecting undesirable users of an online communication resource.

BACKGROUND OF THE INVENTION

Chat rooms represent an increasingly popular Internet application which enables people to have group conversations online. When a chat room user types something in a chat room, it is seen immediately by everyone virtually present in the room. Typed messages in a chat conversation can be seen by anyone in the room or copied and sent to others. A message can be in different formats such as text, speech, image or video. Even though some chat rooms have pre-determined topics, targeted discussions can sometimes wander in unpredictable directions. Though some chat rooms restrict entry, most are open to anyone, and there is usually no way to know the real identity of chatters.

Chat rooms are interesting places for conversation or even learning, but they are also fraught with risk. Chat rooms can also be used by delinquents to abuse potentially vulnerable people. One example is the use of chat rooms by terrorists to hire potentially vulnerable people to their organization. Another very important case is predators that use the chat rooms to find potentially vulnerable children. Many chat rooms have an option to go into a "private" area for one-on-one conversation. Although that can be a good way for two adults or children who are already friends to converse in private, it can be dangerous as well, especially for children, because such private "chats" can be used by predators to groom a child over time, exposing the child to a potentially dangerous online or even face-to-face relationship.

One common mechanism for combating this problem involves members of law enforcement agencies and private vigilantes setting up bogus identities on the Internet and waiting to be contacted by delinquents. In the case of sexual predators, for example, members of a police department may set up a bogus identity as an inviting, under-age girl or boy, then wait for the predators to find them. Well-known implementations of this approach include efforts undertaken by perverted-justice.org, Shannen Rossmiller, and the television program "To Catch a Predator."

A related approach is disclosed in U.S. Patent Application Publication No. 2007/0282623, entitled "Process for Protecting Children from Online Predators," that provides a user interface that a human nanny can use to monitor what children are typing online. This manual approach does not permit automatic detection of delinquents based on their input messages, but rather requires human monitoring.

Other proposed solutions include systems where every time a person connects to a chat room, the person's registered identity is compared to a database of known delinquents. However, this list cannot be exhaustive because people may register using false identities and people may connect without registering. Also, such systems fail to detect first-time predators, which represent more that 90% of the offenders.

For example, U.S. Patent Application Publication No. 2008/0033941, entitled "Verified Network Identity with Authenticated Biographical Information," requires every user to send a biography. This biography is verified by running a background check that includes a criminal record analysis. The user can then connect to a limited number of chat rooms. In addition to the disadvantages described above, a human has to be involved to check the biography, users will sacrifice privacy, and users are unable to access chat rooms instantly, but rather have to wait months until background checking is conducted.

Thus, there exists a need for a technique for automatic detection of delinquent users of an online communication resource.

SUMMARY OF THE INVENTION

An exemplary processor-implemented method of determining whether a user of an online communication resource is an undesirable user includes the steps of building at least one model based on at least one feature of a feature set using at least one machine learning technique; and classifying the user by comparing at least one feature of the feature set that is associated with the user to the at least one model, a determination as to whether the user is an undesirable user being based at least in part on the classification of the user.

An electronic system for determining whether a user of an online communication resource is an undesirable user includes a training module, operative to build at least one model based on at least one subset of a feature set using at least one machine learning technique; and at least a first classifier, operative to classify the user by comparing at least one feature of the feature set that is associated with the user to the at least one model, a determination as to whether the user is an undesirable user being based at least in part on the classification of the user.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Although the present invention will be described herein primarily with regard to an exemplary embodiment directed to real-time monitoring of chat rooms for delinquents, it should be understood that inventive techniques may be applicable to many types of online communication resources, including but not limited to social networking websites, virtual bulletin-board postings, electronic mail conversations, instant messaging conversations, etc. Moreover, inventive techniques may also be applicable to detecting undesirable users other than delinquents, such as those commonly referred to as bots, spammers, phishers, trolls, flooders, etc.

Illustrative embodiments of the present invention provide a system that automatically detects delinquents or predators based on their behavior characteristics when chatting in chat rooms. This system advantageously allows for real-time detection of delinquents. Illustrative embodiments use semi-supervised learning techniques to adapt to new users even when the user doesn't have a history. In an illustrative embodiment, the techniques used by this system are purely stochastic and data driven, using diverse sources of information expressed as features. This system, in an illustrative embodiment, may be easily portable to different languages and is able to be integrated in any chat room.

Figure 1:
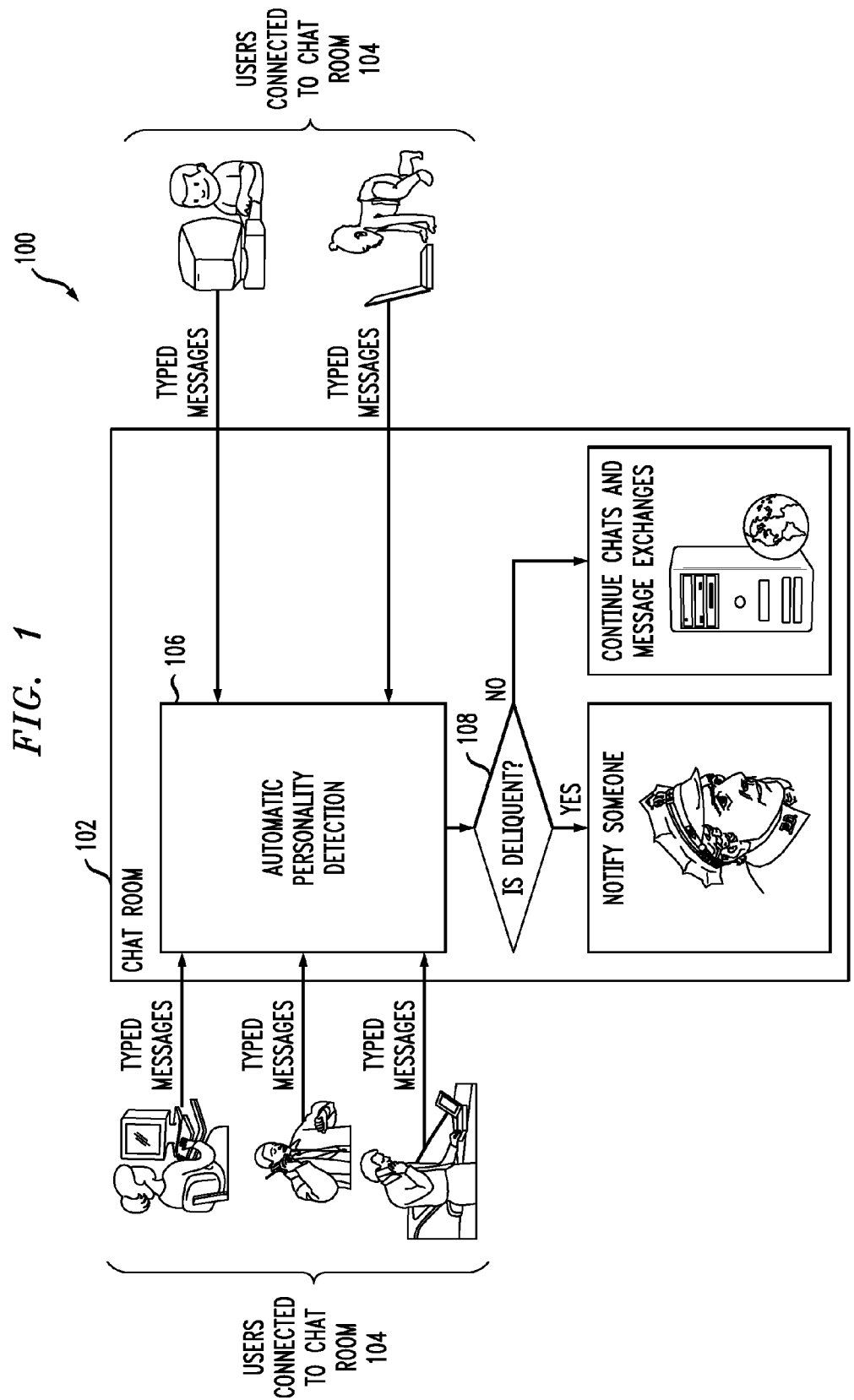
FIG. 1 illustrates an exemplary chat room arrangement in which techniques of the present invention are implemented.

FIG. 1 illustrates an exemplary chat room arrangement 100 in which techniques of the present invention are implemented. A chat room 102 may be viewed conceptually as an entity through which multiple users 104 are connected and can converse, typically via typed messages and/or images. Unfortunately, because of the often anonymous nature of users connected to the chat room, chat rooms can be utilized by delinquents to abuse potentially vulnerable users. In order to avoid this potential for abuse, the chat room 102 preferably includes automatic personality detection 106 in accordance with techniques of the present invention. Automatic personality detection 106 is used to make a determination 108 as to whether or not a given user is delinquent to within some prescribed degree of certainty (e.g., the statistical likelihood that the user is undesirable is above a prescribed threshold of acceptable accuracy). If it is determined that the user is delinquent, the system preferably takes action to notify the appropriate authorities. Alternatively, if the user is determined not to be delinquent, the system continues to monitor chat and message exchanges.

Figure 2:
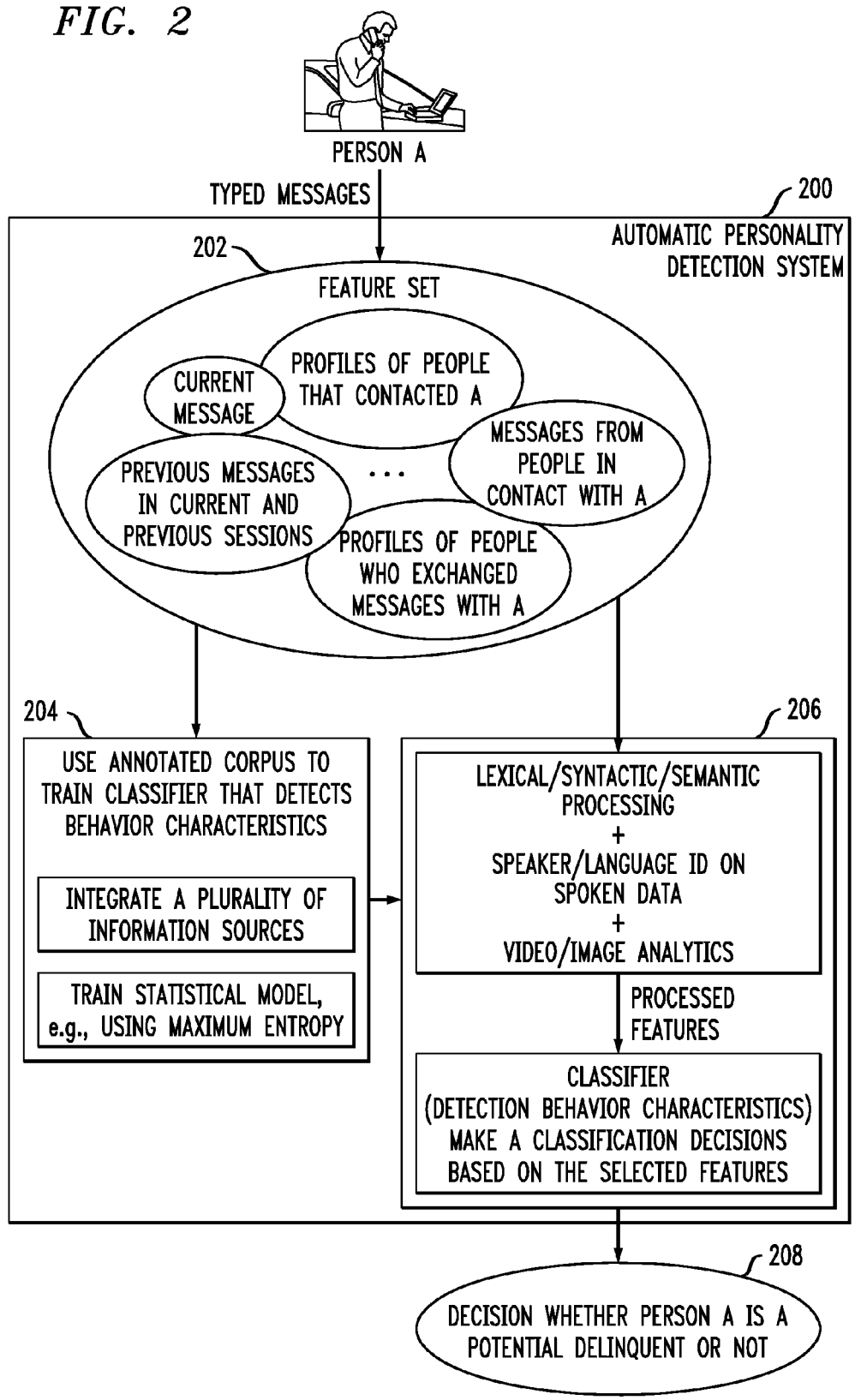
FIG. 2 is block diagram depicting an exemplary automatic personality detection system according to an embodiment of the present invention.

FIG. 2 is block diagram depicting an exemplary automatic personality detection system 200 according to an embodiment of the present invention. Automatic personality detection system 200 is preferably operative to receive typed messages from a user (Person A). System 200 relies on several potential features to detect whether a candidate person is delinquent. These features are preferably maintained in a feature set 202 included in the automatic personality detection system 200. As will be described in further detail herein below, automatic personality detection system 200 preferably employs an annotated corpus of features from the feature set 202 to train (update) a classifier (e.g., model) that detects behavior characteristics of the user, as depicted in functional block 204. During decoding 206, the automatic personality detection system 200 will use the statistical model built during training in conjunction with features extracted from the input message(s) from the user to determine (step 208) whether a person is delinquent or not.

Figure 3:
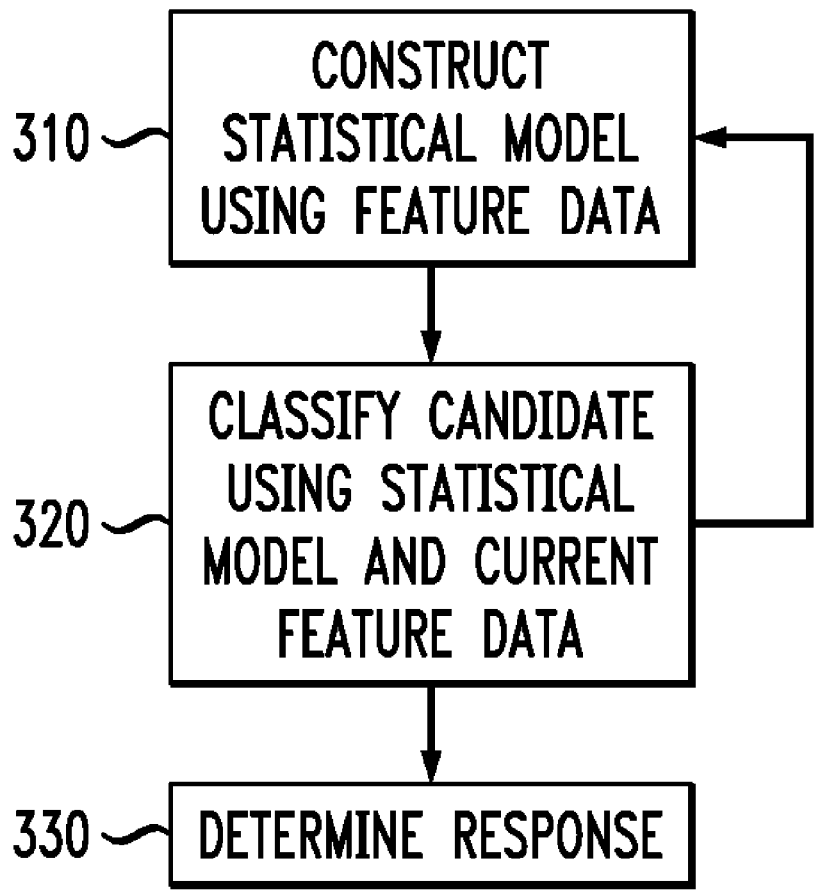
FIG. 3 is a flow diagram depicting an exemplary method for automatic personality detection according to an embodiment of the present invention.

FIG. 3 illustrates an exemplary method 300 for automatic personality detection, according to an illustrative embodiment of the present invention. In step 310, one or more classifiers are trained by developing one or more statistical models which combine statistical scores associated with a plurality of features. These features may be derived from sources including, for example:

(1) The most recently inputted message by the user;
(2) The set of messages inputted by user in the current session;
(3) The set of messages inputted by user in one or more previous sessions;
(4) Messages from other users that are in contact with the user;
(5) Profile of the user if available;
(6) Profile of other users that are communicating with the user in current session;
(7) Profile of other users that have exchanged messages with the user in one or more previous sessions; and/or
(8) Previous identifications of the user by the system.

Combining these scores may include the use of any number of machine learning approaches generally applicable to topic identification, including, for example:

(1) Cosine similarity, as described in, for example, B. Bigi et al., "A Comparative Study of Topic Identification on Newspaper and E-mail," in *String Processing and Information Retrieval-SPIRE, IEEE Computer Society*, 2001;

(2) Voted Perceptron, as described in, for example, Y. Freund & R. Shapire, "Large Margin Classification Using the Perceptron Algorithm," *Machine Learning*, Vol. 37, No. 3, pp. 277-296 (1999);

(3) Support vector machines, as described in, for example, C. Saunders et al., *Support Vector Machine Reference Manual*, Department of Computer Science, Royal Holloway, University of London, 1998;

(4) Conditional random fields, as described in, for example, J. Lafferty et al., "Conditional Random Fields: Probabilistic Models for Segmenting and Labeling Sequence Data," ICML, 2001;

(5) Statistical decision trees;

(6) Term frequency-inverse document frequency (tf-idf), as described in, for example, C. J. Burges, "A Tutorial on Support Vector Machines for Pattern Recognition," in *Data Mining and Knowledge Discovery*, 1998, pp. 121-167;

(7) Bayesian classifiers, as described in, for example, P. Langley et al., "An Analysis of Bayesian Classifiers," In *Proceedings of the Tenth National Conference on Artificial Intelligence*, San Jose, Calif., 1992, pp. 399-406.

In a preferred embodiment, a maximum entropy technique similar to that described in, for example, A. Berger et al., "A Maximum Entropy Approach to Natural Language Processing," *Computational Linguistics*, Vol. 22, No. 1, pp. 39-71 (1996), the disclosure of which is incorporated by reference herein, may be used. A major advantage of using maximum entropy is its ability to integrate diverse types of information (features) and make a classification decision by aggregating all information available for a given classification, as discussed in, for example, J. Goodman, "Exponential Priors for Maximum Entropy Models," HLT-NAACL 2004: Main Proceedings, pages 305-312, Boston, Mass., USA, May 2-May 7, 2004, Association for Computational Linguistics, the disclosure of which is incorporated by reference herein. Moreover, maximum entropy may be combined with other machine learning techniques, such as those enumerated above, as described in, for example, I. Zitouni et al., "Constrained Minimization Technique for Topic Identification using Discriminative Training and Support Vector Machines," in *Proceeding of the International Conference on Speech and Language Processing*, 2004.

Maximum entropy has many advantages over the rule-based methods of the prior art. For example, maximum entropy has the ability to integrate arbitrary types of information and make a classification decision by aggregating all information available for a given classification. Maximum entropy also permits the use of many information sources and provides flexibility and accuracy needed for changing dynamic language models. Maximum entropy modeling may be used to integrate a subset of one or more possible information sources, including those enumerated above. Information or features extracted from these sources may be used to train a maximum entropy model.

The maximum entropy method is a flexible statistical modeling framework that has been used widely in many areas of natural language processing. Maximum entropy modeling produces a probability model that is as uniform as possible while matching empirical feature expectations. This can be interpreted as making as few assumptions as possible in the model. Within the maximum entropy framework, any type of feature can be used, enabling the system designer to experiment with different feature types. Maximum entropy modeling permits combinations of multiple overlapping information sources. The information sources may be combined as follows:

$$P(o \mid h) = \frac{e^{\sum_i \lambda_i f_i(o,h)}}{\sum_{o'} e^{\sum_j \lambda_j f_j(o',h)}}$$

This equation describes the probability of a particular outcome (o) (e.g., one of the arguments) given an input message, feature set and the context. $\lambda_i$ is a weighting function or constant used to place a level of importance on the information being considered for the feature. Note that the denominator includes a sum over all possible outcomes (o'), which is essentially a normalization factor for probabilities to sum to 1. The indicator functions or features $f_i$ are activated when certain outcomes are generated for certain context:

$$f_i(o \mid h) = \begin{cases} 1, & \text{if } o = o_i \text{ and } q_i(h) = 1 \\ 0, & \text{otherwise} \end{cases},$$

where $o_i$ is the outcome associated with feature $f_i$, and $q_i(h)$ is an indicator function for histories. The maximum entropy models may be trained using improved iterative scaling.

In step 320, the classification model, statistical or rule-based, determined in step 310 is applied to detect the personality of a user in a chat room (e.g., whether the user is a delinquent). During this detection or decoding step, the system may use one or more models built during training as well as a set of features extracted from the input message(s) and other available resources to classify whether a person is delinquent or not. This set of features may be the same as the set of features used in the training phase to construct the model, it may be a subset thereof, or it may be a different set of features. A machine learning approach such as maximum entropy framework may be used to build the classification model based on these features. The classification model is then used to classify or identify the user and/or make a decision if the user is delinquent or not.

Once a user logs in to a chat room and starts to input messages, the classifier immediately processes those messages and other available resources in the chat room database to extract features. Those features are then used to identify or classify the user's personality (e.g., detect if he/she is a potential delinquent or not). The input message can be in the form of text, speech, image and/or video. The classifier applies several natural language processing techniques on a feature set (source of information) to identify a delinquent. Examples of natural language processing techniques suitable for use with an illustrative embodiment of the present invention include:

(1) Extraction of lexical features such as words, n-grams (previous/next words), morphological analysis of current input messages, etc.;

(2) Extraction of syntactic analysis of the same messages such as the Part-Of-Speech, parse tree, and prop tree information;

(3) Use of information which is the result of conducting semantic analysis on the input data to extract information such as date, time, location, organization, geopolitical entity, events, relations, co-reference between entities in the data, mentions, etc.;

(4) If the input message comprises speech, use of techniques such as speaker identification, language identification, etc.;

(5) If the input message comprises an image or a video, image and video analytics may be applied to extract relevant features (e.g., determining whether an image or video contains obscene images or pornography, etc.).

A binary classifier may be used if the goal is only to predict or classify whether a user is a delinquent or not. Alternatively or additionally, a multi-class classifier may be used to predict a category of delinquency (e.g., predator, terrorist, killer, etc.). Moreover, in a preferred embodiment, the classifier can learn from previous decisions (e.g., by way of a feedback collection mechanism for modifying decisions or stored historical data) to adjust and re-adapt its results (as shown by the arrow leading from step 320 to step 310). Several unsupervised techniques in the machine learning field are available to achieve this, as will be understood by one having skill in the art.

In step 330, an appropriate response may be generated responsive to the results of step 320. For example, once a user is identified as a delinquent by the system, an instant message may be sent to notify a chat operator or law enforcement officer. Alternatively or additionally, a user may be automatically removed or banned from the chat room responsive to a determination that the user is a delinquent or other undesirable user.

Figure 4:
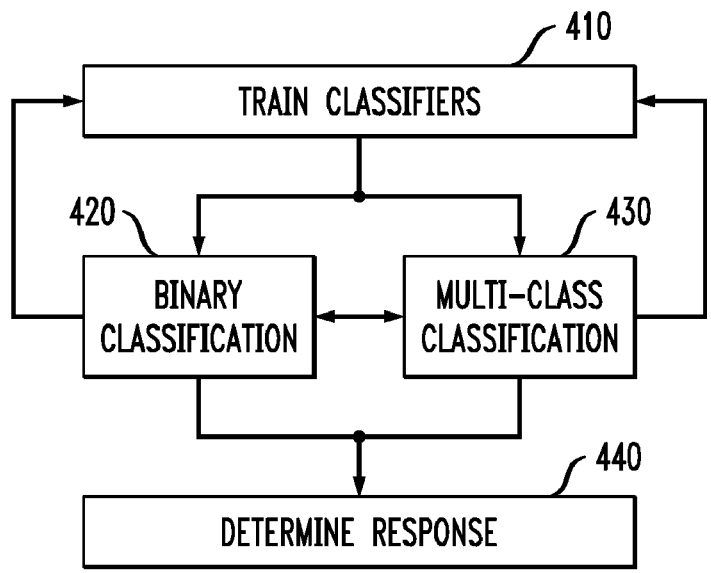
FIG. 4 is a flow diagram depicting another exemplary method for automatic personality detection according to another embodiment of the present invention.

FIG. 4 illustrates another exemplary method 400 for automatic personality detection, according to an illustrative embodiment of the present invention. Step 410 is a training process similar to that described above with reference to step 310 in FIG. 3. However, here, two classifiers are used: a binary classifier which will identify whether a user is a delinquent or not; and a multi-class classifier which can refine the result of the first classifier to detect what category of delinquency a user is.

In step 420, the binary classifier is used to identify whether a user is a delinquent or not. In step 430, responsive to a determination by the binary classifier that the user is a delinquent, a multi-class classifier determines what type of delinquent the user is. Again, one or more of the classifiers can learn from previous decisions to adjust and re-adapt its results (as shown by the arrows leading from steps 420 and 430 to step 410). In step 440, an appropriate response may be generated responsive to the results of steps 420 and/or 430. For example, once a user is identified as a delinquent by the system, an instant message may be sent to notify a chat operator or law enforcement officer. Alternatively or additionally, a user may be automatically removed or banned from the chat room responsive to a determination that the user is a delinquent or other undesirable user. Different kinds of responses may be used for different types of delinquents. For example, detection of a terrorist or a pedophile may result in notification of a law enforcement agency, whereas detection of a spammer or troll may not.

The methodologies of embodiments of the invention may be particularly well-suited for use in an electronic device or alternative system. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be loaded onto a computer or other programmable data processing apparatus to cause a series of operational steps to be performed on the computer or other programmable apparatus to produce a computer implemented process such that the instructions, when executed on the computer or other programmable apparatus, provide processes for implementing the functions/acts specified in the flowchart and/or block diagram block or blocks.

Figure 5:
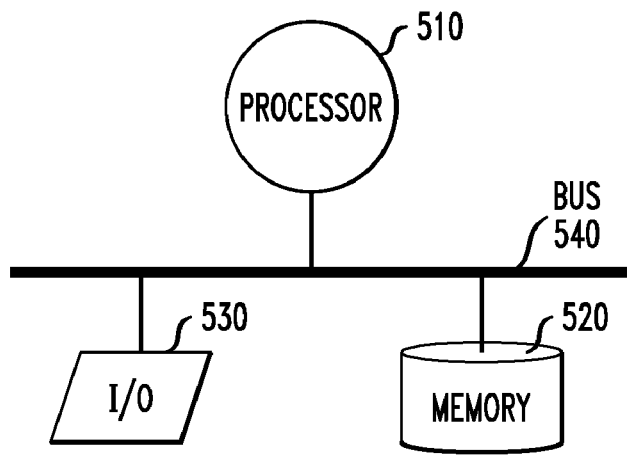
FIG. 5 is a block diagram depicting an exemplary processing system in which techniques of the present invention may be implemented.

For example, FIG. 5 is a block diagram depicting an exemplary processing system 500 formed in accordance with an aspect of the invention. System 500 may include a processor 510, memory 520 coupled to the processor (e.g., via a bus 540 or alternative connection means), as well as input/output (I/O) circuitry 530 operative to interface with the processor. The processor 510 may be configured to perform at least a portion of the methodologies of the present invention, illustrative embodiments of which are shown in the above figures and described herein.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

Accordingly, an application program, or software components thereof, including instructions or code for performing the methodologies of the invention, as heretofore described, may be stored in one or more of the associated storage media (e.g., ROM, fixed or removable storage) and, when ready to be utilized, loaded in whole or in part (e.g., into RAM) and executed by the processor 510. In any case, it is to be appreciated that at least a portion of the components shown in the above figures may be implemented in various forms of hardware, software, or combinations thereof, e.g., one or more DSPs with associated memory, application-specific integrated circuit(s), functional circuitry, one or more operatively programmed general purpose digital computers with associated memory, etc. Given the teachings of the invention provided herein, one of ordinary skill in the art will be able to contemplate other implementations of the components of the invention.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method of determining whether a user of an online communication resource has an undesirable behavioral personality, the method comprising the steps of:
    building at least one model based on at least one feature using at least one machine learning technique;
    classifying at least one behavioral characteristic of the user by comparing at least one feature of a feature set that is associated with the user to the at least one model, wherein the at least one feature of the feature set is a message content feature obtained through use of the online communication resource by the user;
    determining whether the user has an undesirable behavioral personality based at least in part on the classification of the behavioral characteristic of the user;
    wherein the building, classifying and determining steps are performed by a processing system comprising a processor coupled to a memory.

2. The method of claim 1, wherein the feature set which is associated with the user comprises at least a portion of a set of communications initiated and/or received by the user during one or more communication sessions on the online communication resource.

3. The method of claim 1, wherein the feature set which is associated with the user comprises a profile of one or more users of the online communication resource.

4. The method of claim 1, further comprising the step of:
    responsive to a determination based on the step of classifying the user to determine whether the user is undesirable, determining a category of undesirability of the user based at least in part on an analysis of data by at least one of a binary classifier and a multi-class classifier using the at least one model and the at least one feature of the feature set which is associated with the user.

5. The method of claim 1, wherein the at least one machine learning technique comprises a maximum entropy technique.

6. The method of claim 1, wherein the classifying step comprises an application of at least one natural language processing technique to the at least one model and the at least one feature of the feature set which is associated with the user.

7. The method of claim 6, wherein the at least one natural language processing technique comprises at least one of a lexical analysis, a syntactic analysis, and a semantic analysis.

8. The method of claim 1, further comprising the step of updating the at least one model based at least in part on the classification of the user.

9. The method of claim 8, wherein the step of updating the at least one model comprises modifying at least one of decisions and stored historical data using a feedback collection mechanism.

10. The method of claim 1, further comprising the step of generating a notification to at least one entity based on said classifying.

11. The method of claim 1, wherein the determination as to whether the user is undesirable comprises a determination as to whether the user is likely to engage in unlawful activities.

12. The method of claim 1, wherein the determination as to whether the user is undesirable comprises a determination as to whether the user is likely to abuse one or more other users of the online communication resource.

13. An electronic system for determining whether a user of an online communication resource has an undesirable behavioral personality, the electronic system comprising:
    a training module, operative to build at least one model based on at least one feature using at least one machine learning technique; and
    at least a first classifier, operative to: classify at least one behavioral characteristic of the user by comparing at least one feature of a feature set that is associated with the user to the at least one model, wherein the at least one feature of the feature set is a message content feature obtained through use of the online communication resource by the user; and to determine whether the user has an undesirable behavioral personality based at least in part on the classification of the behavioral characteristic of the user.

14. The electronic system of claim 13, wherein the at least first classifier comprises at least one of a binary classifier and a multi-class classifier operative to determine a category of undesirability of the user.

15. The electronic system of claim 14, further comprising:
    at least one multi-class classifier operative, in response to a determination based on the classification by the at least first classifier that the user is undesirable, to determine a category of undesirability of the user based at least in part on an analysis of data by at least one multi-class classifier using the at least one model and the at least one feature of the feature set which is associated with the user.

16. The electronic system of claim 13, wherein the training module is further operative to update the at least one model based at least in part on the classification of the user.

17. The electronic system of claim 16, wherein the training module is operative to update the at least one model by modifying at least one of decisions and stored historical data using a feedback collection mechanism.

18. The electronic system of claim 13, wherein the at least first classifier is further operative to generate a notification to at least one entity based at least in part on said classification of the user.

19. An apparatus for determining whether a user of an online communication resource has an undesirable behavioral personality, the apparatus comprising:
    at least one memory; and
    at least one processor coupled to the at least one memory and operative:
        to build at least one model based on at least one feature using at least one machine learning technique;
        to classify at least one behavioral characteristic of the user by comparing at least one feature of a feature set that is associated with the user to the at least one model, wherein the at least one feature of the feature set is a message content feature obtained through use of the online communication resource by the user; and to determine whether the user has an undesirable behavioral personality based at least in part on the classification of the behavioral characteristic of the user.

20. The apparatus of claim 19, wherein the processor is further operative to update the at least one model based at least in part on the classification of the user.

21. The apparatus of claim 20, wherein the processor is further operative to update the at least one model by modifying at least one of decisions and stored historical data using a feedback collection mechanism.

22. The apparatus of claim 19, wherein the processor is further operative to generate a notification to at least one entity based at least in part on said classification of the user.

23. A computer program product for determining whether a user of an online communication resource has an undesirable behavioral personality, the computer program product comprising a computer usable medium having computer usable program code embodied therewith, the computer usable program code comprising computer usable program code configured:

to build at least one model based on at least one feature using at least one machine learning technique;

to classify at least one behavioral characteristic of the user by comparing at least one feature of a feature set that is associated with the user to the at least one model, wherein the at least one feature of the feature set is a message content feature obtained through use of the online communication resource by the user; and to determine whether the user has an undesirable behavioral personality based at least in part on the classification of the behavioral characteristic of the user.

24. The computer program product of claim 23, wherein the computer usable program code further comprises computer usable program code configured to update the at least one model based at least in part on the analysis.

* * * * *